United States Patent
Jooste

(10) Patent No.: US 7,360,339 B1
(45) Date of Patent: Apr. 22, 2008

(54) AUTOMOBILE DOOR PROTECTOR

(76) Inventor: Jacobus A. Jooste, P.O. Box 755, Nylstroom (ZA) 0510

( * ) Notice: Subject to any disclaimer, the term of this patent is extended or adjusted under 35 U.S.C. 154(b) by 322 days.

(21) Appl. No.: 11/222,379

(22) Filed: Sep. 9, 2005

(51) Int. Cl.
*B60J 5/00* (2006.01)

(52) U.S. Cl. ........................ 49/462; 296/152

(58) Field of Classification Search .......... 49/460, 49/461, 462, 503; 296/152; 293/126, 128
See application file for complete search history.

(56) References Cited

U.S. PATENT DOCUMENTS

| | | | | |
|---|---|---|---|---|
| 2,678,232 A * | 5/1954 | Barry | ............................ | 49/462 |
| 3,243,222 A * | 3/1966 | Loughary et al. | ............. | 49/460 |
| 3,280,510 A * | 10/1966 | Vaux | ............................ | 49/401 |
| 3,473,264 A * | 10/1969 | Holka | ........................ | 49/462 |
| 3,576,338 A * | 4/1971 | Horton | ...................... | 292/213 |
| 3,879,895 A * | 4/1975 | Hinderks | .................... | 49/462 |
| 4,839,991 A * | 6/1989 | Rathgeb | ..................... | 49/462 |
| 6,533,346 B2 * | 3/2003 | Yu | .............................. | 296/152 |

* cited by examiner

*Primary Examiner*—Jerry Redman
(74) *Attorney, Agent, or Firm*—Crossley Patent Law; Mark A. Crossley

(57) ABSTRACT

An automobile door protector comprising an actuator pin, a pulley, an extension spring affixed to the actuator pin and to a cable that partially surrounds the pulley, the cable affixed to an opposite end of the spring, a pair of spaced apart mounting flanges within the door pivotally holding a pivot rod affixed to a rubberized semicircular door protector, the protector proximal to an anterior edge of the door, the cable affixed to the protector, whereby opening the door activates the actuator pin to move the cable which thereby pivots the protector outwardly and around the anterior door edge.

15 Claims, 4 Drawing Sheets

US 7,360,339 B1

AUTOMOBILE DOOR PROTECTOR

BACKGROUND OF THE INVENTION

Opening car doors against objects and against other cars has long been a problem in that both the opening door and the potentially struck object or opposing automobile are often damaged. With few exceptions, the solutions offered to date have been passive cushioning devices. Problems exist, though, because the effectiveness of passive cushioning devices is limited by their location and by their dimensions. Few serve to fully protect either the opening door or what may be struck. The present invention solves these problems with active automobile door protection.

FIELD OF THE INVENTION

The present invention relates to automobile door protection and more specifically to an active automobile door protector.

SUMMARY OF THE INVENTION

The general purpose of the automobile door protector, described subsequently in greater detail, is to provide a automobile door protector which has many novel features that result in an improved automobile door protector which is not anticipated, rendered obvious, suggested, or even implied by prior art, either alone or in combination thereof.

To accomplish this, the automobile door protector comprises an actuator pin, the actuator pin having a contact end and an actuator end. The pin is disposed to contact the door jamb of the automobile when the door of the auto is closed. A bushing is installed within an interior facing of the door. The bushing surrounds the actuator pin and provides for bushed movement of the pin therein. The spring anchor is disposed on the actuator end of the actuator pin. A pulley is disposed within the door. The pulley axis is perpendicular to the movement of the actuator pin. The pulley support is affixed to the interior of the door. One end of an extension spring is affixed to the spring anchor of the actuator pin. A cable is affixed to an opposite end of the spring. The cable operates partially around the pulley. A pair of spaced apart mounting flanges within the door are coplanar to a vertical axis of the door and door hinges. A pivot rod is pivotally contained within the mounting flanges. A semicircular rubberized protector is affixed to the pivot rod. The protector is proximal to an anterior edge of the door. The cable is affixed to the protector.

Opening the door activates the actuator pin to move outwardly from within the door, thereby moving the cable which thereby pivots the protector outwardly from the door, thereby protecting the door and door edge and thereby protecting objects that are encountered by the door and door edge.

Thus has been broadly outlined the more important features of the automobile door protector so that the detailed description thereof that follows may be better understood and in order that the present contribution to the art may be better appreciated.

Numerous objects, features and advantages of the automobile door protector will be readily apparent to those of ordinary skill in the art upon reading the following detailed description of presently preferred, but nonetheless illustrative, examples of the automobile door protector when taken in conjunction with the accompanying drawings. In this respect, before explaining the current examples of the automobile door protector in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the automobile door protector.

It is therefore important that the claims be regarded as including such equivalent constructions insofar as they do not depart from the spirit and scope of the present invention.

Objects of the automobile door protector, along with various novel features that characterize the invention are particularly pointed out in the claims forming a part of this disclosure. For better understanding of the automobile door protector, its operating advantages and specific objects attained by its uses, refer to the accompanying drawings and description.

DETAILED DESCRIPTION OF THE DRAWINGS

With reference now to the drawings, and in particular FIGS. 1 through 4 thereof, example of the automobile door protector employing the principles and concepts of the present invention and generally designated by the reference number 10 will be described.

Figure 1:
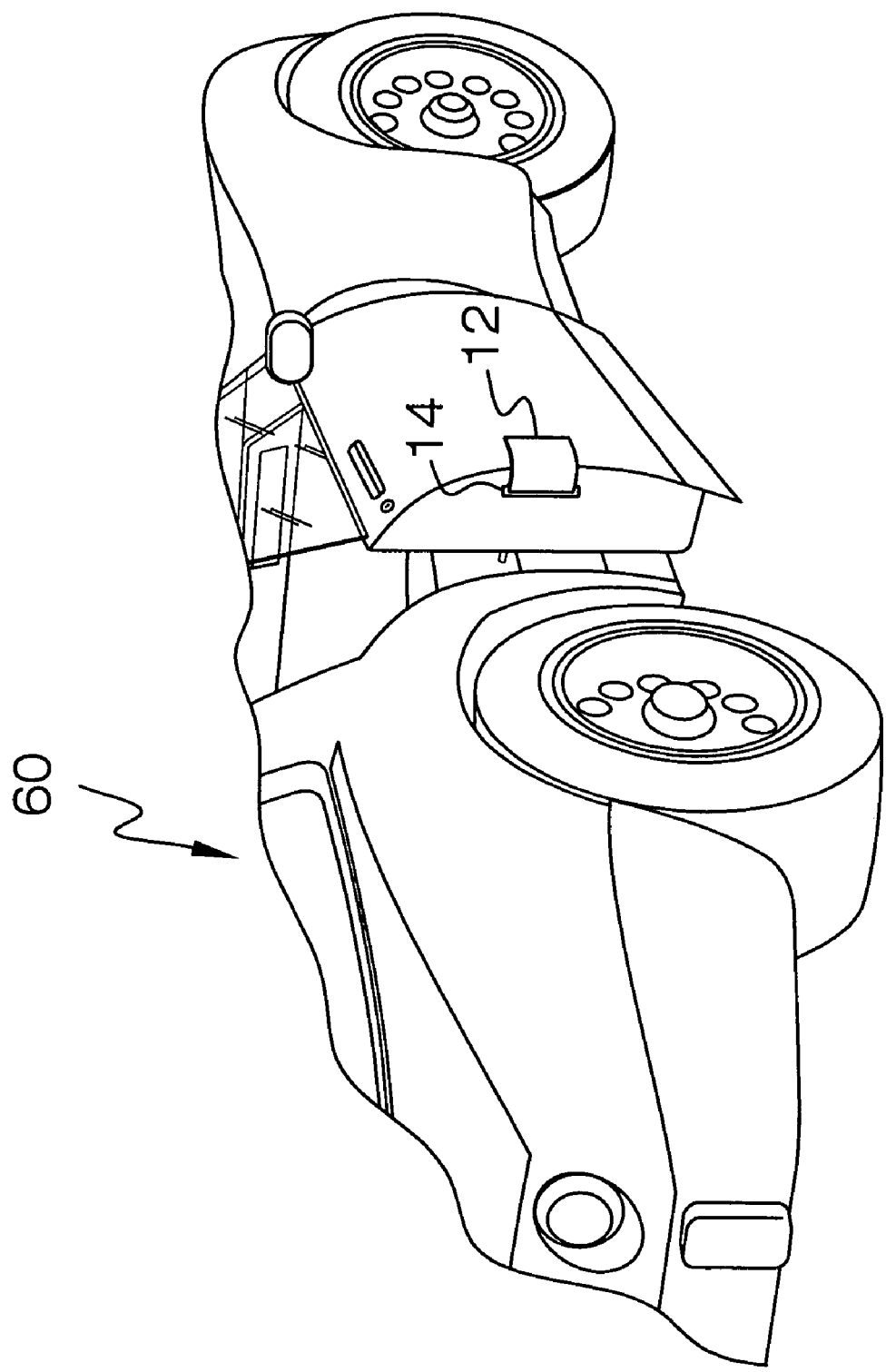
FIG. 1 is a perspective view of the invention installed within the door of an automobile, the door partially open.

Referring to FIG. 1, the automobile door protector 10 is partially comprised of a rubberized semicircular protector 12 disposed on the exterior of the door 62 of the automobile 60. The door 62 is partially opened to reveal a part of the actuator pin 18 of the invention 10. The semicircular protector is extended outwardly from the door 62.

Figure 2:
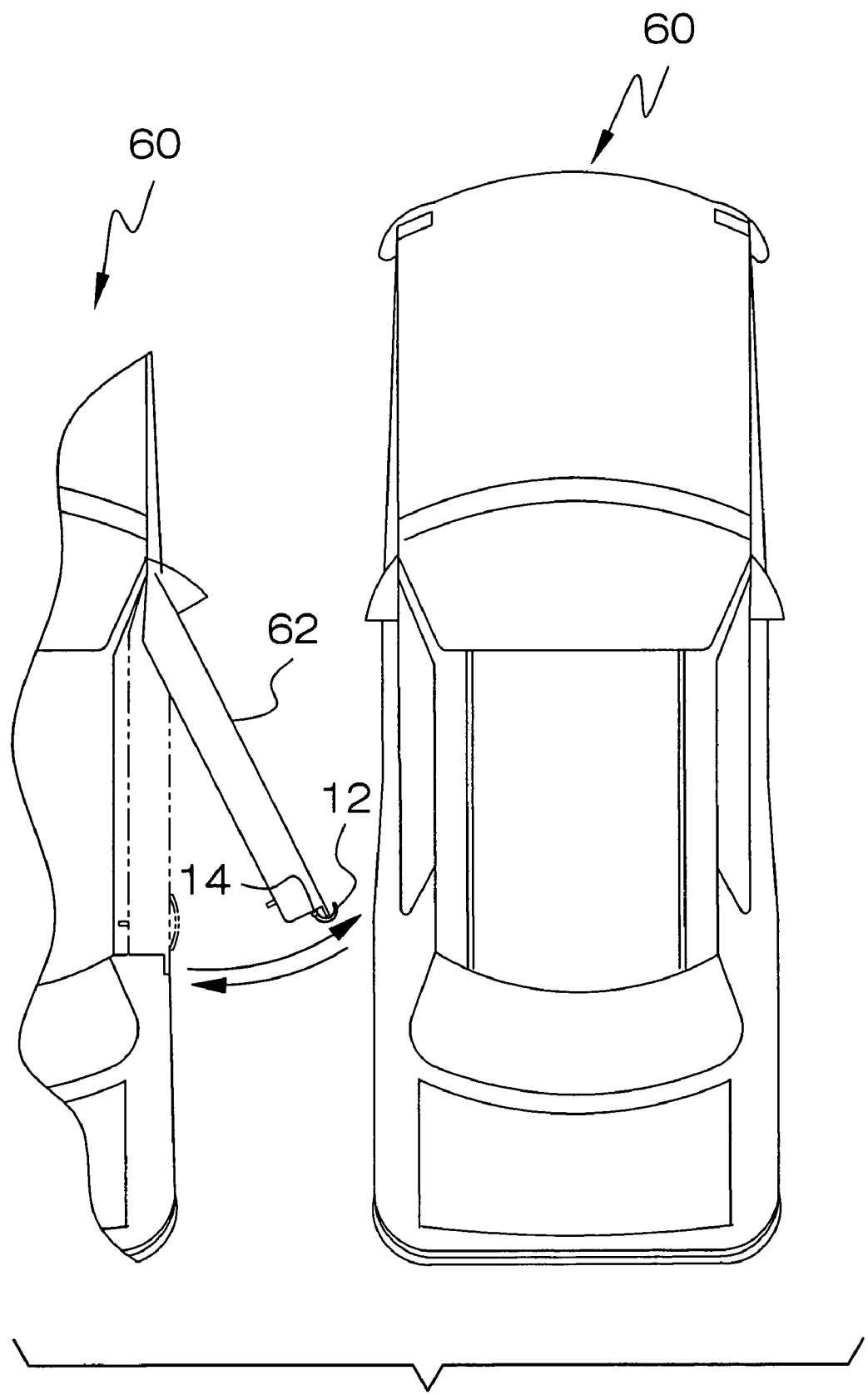
FIG. 2 is top plan view of the auto in FIG. 1, the protector preventing the door of the first auto from striking the second auto.

Referring to FIG. 2, the semicircular protector 12 is extended outwardly from the door 62 to prevent door 62 from contacting a second auto 61.

Figure 3:
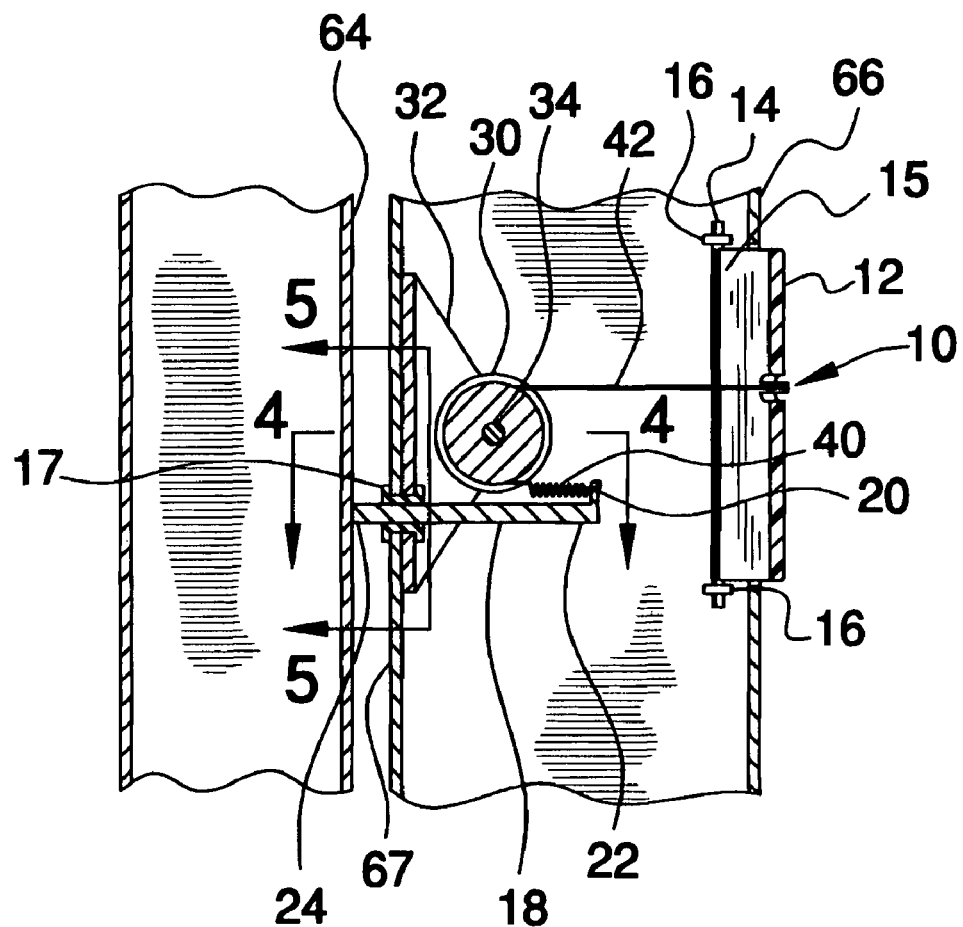
FIG. 3 is a side cross sectional view of the invention within the door of an automobile.

Referring to FIG. 3, the actuator pin 18 is slideably housed within the bushing 17. The bushing 17 is fitted within the interior door face 67. In one example of the invention 10, the actuator pin 18 is round. In the preferred example of the invention 10, the actuator pin 18 is square. The square pin 18 offers greater stability in locating the pin 18 such that the spring 40 is continually aligned correctly. The square pin 18 also aids in preventing binding in the case of pin 18 or bushing 17 wear. The contact end 24 of the pin 18 is in contact with the door jamb 64. The pin 18 is thereby pushed substantially within the door 62 interior. The actuator end 22 of the pin 18 further comprises the spring anchor 20. The extension spring 40 is affixed to the spring anchor 20.

The opposite end of the spring 40 is affixed with the cable 42. The cable 42 partially surrounds the pulley 30. The pulley 30 pivots around the pulley pivot 34. The pulley pivot 34 is supported by the pulley support 32. The pulley support 32 is affixed to the door 62 interior. The pulley support 32 is triangulated with a perpendicularly attached base which anchors to the interior of the door 62, opposite the interior door face 67. The pulley 30 pivot is perpendicular to the axis of the actuator pin 18 slide travel. The opposite end of the cable 42 is connected to the inner border 15 of the semicircular protector 12. Other examples of the invention 10 include protectors 12 which are not semicircular; however, the semicircular protector 12 is the preferred example. The protector 12 is offered in both a rigid and flexible makeup. Additionally, the protector 12 is offered with either all or part of the protector 12 covered in a rubberized material for making flexible, non-damaging contact with extraneous objects. The inner border 15 is affixed to the vertically disposed pivot rod 14. The pivot rod 14 pivots within the spaced apart mount flanges 16. The semicircular protector 12 is in the withdrawn position.

Figure 4:
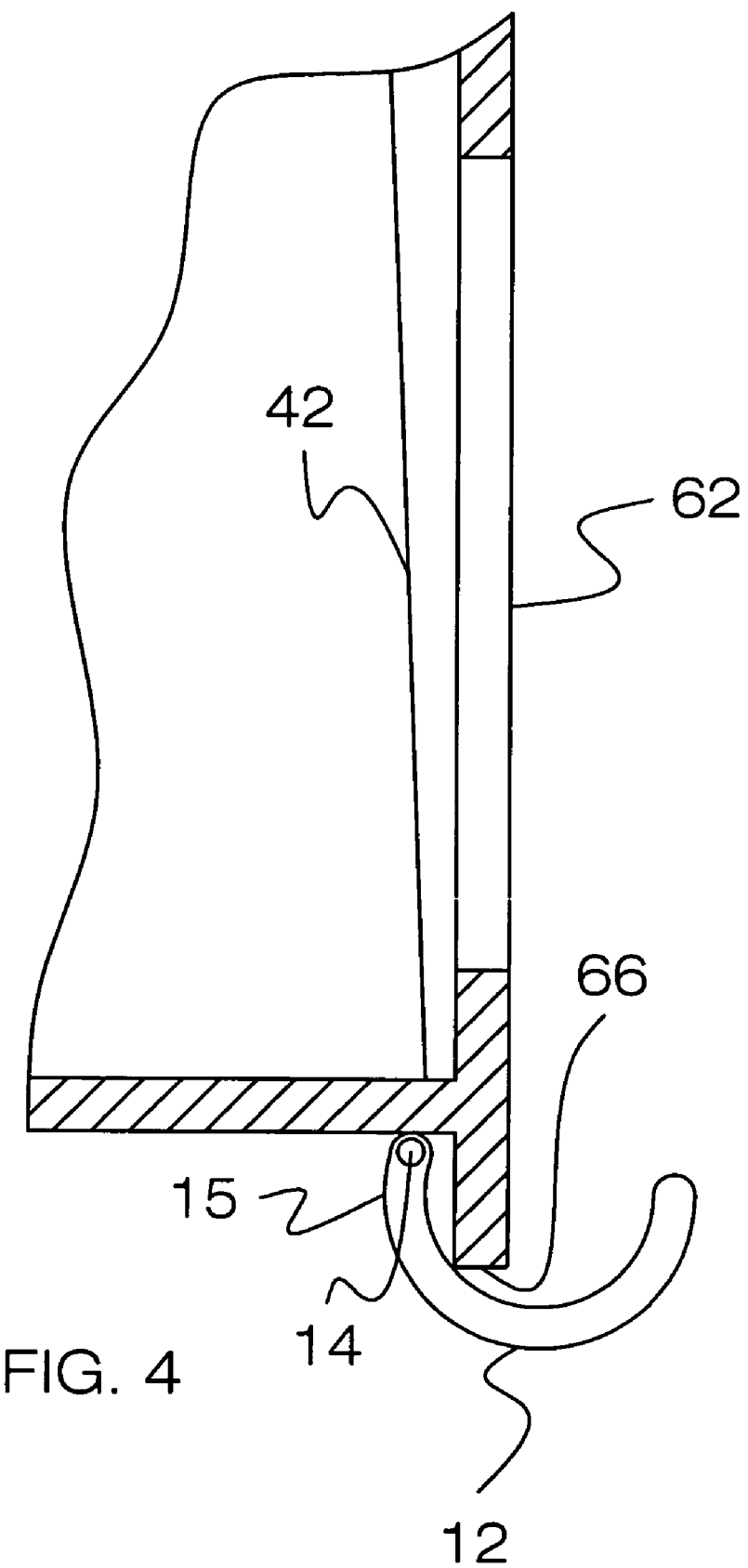
FIG. 4 is a top plan view of the semicircular protector of the invention taken along the line 44 of FIG. 3.

Referring to FIG. 4, the withdrawn semicircular protector 12 is proximal to the door 62. The cable 42 is substantially withdrawn within the door 62.

Figure 5A:
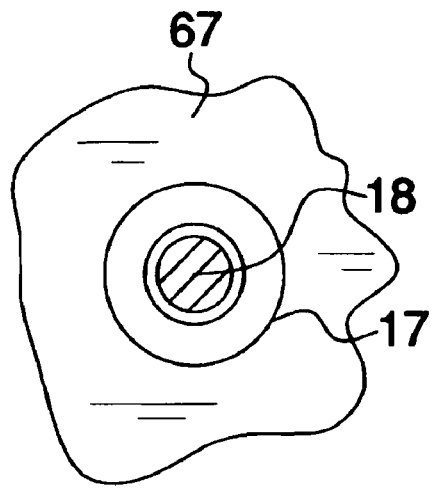
FIGS. 5a and 5b depict a cross-sectional view of a round pin and a square pin respectively.
Figure 5B:
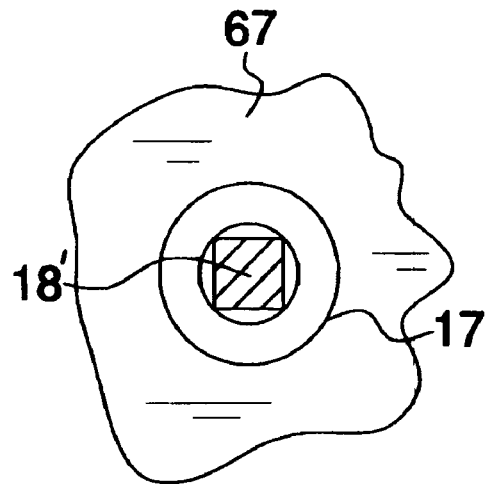

Referring to FIGS. 5a and 5b, an illustration of a round pin 18 and a square pin 18' is shown.

With respect to the above description then, it is to be realized that the optimum dimensional relationships for the parts of the automobile door protector, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An automobile door protector, the protector comprising:
   an actuator pin, the actuator pin having a contact end and an actuator end, the pin disposed to contact the door jamb of the automobile;
   a spring anchor disposed on the actuator end of the pin;
   a bushing within an interior facing of the door, the bushing surrounding the actuator pin and provided for bushed movement of the pin therein;
   a pulley disposed within the door, the pulley axis perpendicular to the movement of the actuator pin;
   a pulley support affixed to an interior of the door;
   an extension spring, one end of the extension spring affixed to the spring anchor of the actuator pin;
   a cable affixed to an opposite end of the spring, the cable partially around the pulley;
   a pair of spaced apart mount flanges within the door, the flanges coplanar to a vertical axis of the door and door hinges;
   a pivot rod pivotally contained within the mounting flanges;
   a protector affixed to the pivot rod, the protector proximal to an anterior edge of the door;
   the cable affixed to the protector,
   whereby opening the door activates the actuator pin to move outwardly from within the door, thereby moving the cable which thereby pivots the protector outwardly, thereby protecting the door and door edge and thereby protecting objects that are encountered by the door and door edge.

2. The invention in claim 1 wherein the actuator pin is round.

3. The invention in claim 2 wherein the protector is semicircular.

4. The invention in claim 1 wherein the actuator pin is square.

5. The invention in claim 4 wherein the protector is semicircular.

6. The invention in claim 1 wherein the protector is semicircular.

7. An automobile door protector, the protector comprising:
   an actuator pin, the actuator pin having a contact end and an actuator end, the pin disposed to contact the door jamb of the automobile;
   a spring anchor disposed on the actuator end of the pin;
   a bushing within an interior facing of the door, the bushing surrounding the actuator pin and provided for bushed movement of the pin therein;
   a pulley disposed within the door, the pulley axis perpendicular to the movement of the actuator pin;
   a pulley support affixed to an interior of the door;
   an extension spring, one end of the extension spring affixed to the spring anchor of the actuator pin;
   a cable affixed to an opposite end of the spring, the cable partially around the pulley;
   a pair of spaced apart mount flanges within the door, the flanges coplanar to a vertical axis of the door and door hinges;
   a pivot rod pivotally contained within the mounting flanges;
   a semicircular protector affixed to the pivot rod, the protector proximal to an anterior edge of the door;
   the cable affixed to the protector,
   whereby opening the door activates the actuator pin to move outwardly from within the door, thereby moving the cable which thereby pivots the protector outwardly and around the anterior door edge, thereby protecting the door and door edge and thereby protecting objects that are encountered by the door and door edge.

8. The invention in claim 7 wherein the actuator pin is round.

9. The invention in claim 8 wherein the protector is flexible.

10. The invention in claim 8 wherein the protector is coated with a rubberized material.

11. The invention in claim 7 wherein the actuator pin is square.

12. The invention in claim 11 wherein the protector is flexible.

13. The invention in claim 11 wherein the protector is coated with a rubberized material.

14. The invention in claim 7 wherein the protector is flexible.

15. The invention in claim 7 wherein the protector is coated with a rubberized material.

\* \* \* \* \*